US012638361B2

(12) United States Patent
Cassady et al.

(10) Patent No.: US 12,638,361 B2
(45) Date of Patent: May 26, 2026

(54) ADAPTERS FOR INSPECTION OF OPTICAL FIBER TERMINATING ENDS

(71) Applicant: VIAVI SOLUTIONS INC., Chandler, AZ (US)

(72) Inventors: Kevin Cassady, Monroe, WA (US); Christian Richard Comtois-Arnaldo, Ottawa (CA); Robert Matthew Adams, Ottawa (CA); Christopher Russell Wagner, Kanata (CA); Nicklos Joseph Bulitka, Stittsville (CA); Abhilash Sukumari, Nepean (CA); Jeffery Stephen Graves, Oxford Station (CA); Joshua Benjamin Julius Philipson, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 222 days.

(21) Appl. No.: 18/531,098

(22) Filed: Dec. 6, 2023

(65) Prior Publication Data

US 2025/0189404 A1    Jun. 12, 2025

(51) Int. Cl.
    *G01M 11/00*    (2006.01)
(52) U.S. Cl.
    CPC .................................... *G01M 11/31* (2013.01)
(58) Field of Classification Search
    CPC .................. G06T 11/206; G06T 11/60; G06T 2207/20084; G06T 2207/30242;
    (Continued)

(56) References Cited

U.S. PATENT DOCUMENTS

| | | | |
|---|---|---|---|
| 11,391,933 B2 | 7/2022 | Kriofske et al. | |
| 2010/0046893 A1* | 2/2010 | Pyo ....................... | G02B 6/4292 385/88 |

(Continued)

FOREIGN PATENT DOCUMENTS

| | | | | |
|---|---|---|---|---|
| CN | 114070395 A | * | 2/2022 | ......... H04B 10/0799 |
| CN | 116264052 A | * | 6/2023 | ............. G09G 3/006 |

(Continued)

OTHER PUBLICATIONS

"Different types of fiberoptic connectors", My Network Insights. downloaded from the Internet on Dec. 4, 2023, 5 pages. https://dc.mynetworkinsights.com/different-types-of-fiber-optic-cable-connectors/.

*Primary Examiner* — Michael P Stafira
(74) *Attorney, Agent, or Firm* — Mannava & Kang, P.C.

(57) ABSTRACT

According to examples, an apparatus may include an optical system to capture images of a DUT when the DUT is positioned in a removable DUT adapter plate for inspection in the apparatus. The apparatus may also include a mounting tray having an opening, in which the mounting tray is to support the removable DUT adapter plate, the removable DUT adapter plate includes an identification code positioned on the removable DUT adapter plate, and the optical system is to capture an image of the identification code through the opening in the mounting tray. The apparatus may further include a controller to receive the image of the identification code from the optical system, decode information included in the identification code, and set at least one of a lighting profile, an inspection profile, and pass/fail parameters of the optical system to be used in inspecting the DUT based on the decoded information.

20 Claims, 6 Drawing Sheets

APPARATUS
100

(58) Field of Classification Search
CPC ... G06T 7/11; G06T 7/194; G06T 7/75; G06T
7/77; G06T 19/006; G06T 2207/20081;
G06T 2207/30108; G06T 7/0002; G06T
7/0004; G06T 7/001; G06T 7/70; G06T
7/80; G06T 2207/10148; G06T 7/66;
G06T 19/20; G06T 7/521; G06T 7/579;
G06T 7/60; G06T 15/20; G06T 2200/04;
G06T 2200/24; G06T 2207/10012; G06T
2207/30104; G06T 2207/30164; G06T
2207/30204; G06T 7/20; G06T 7/30;
G06T 7/50; G06T 7/55; G06T 7/74;
G06T 7/90; G06V 10/75; G06V 10/462;
G06V 10/803; G06V 20/10; G06V 20/20;
G06V 20/52; G06V 2201/03; G06V
2201/034; G06V 10/40; G06V 20/66;
G06V 20/80; G06V 30/10; G06V 30/32;
G06V 10/147; G06V 10/88; G02B
6/4482; G02B 6/3895; G02B 6/3825;
G02B 6/562; G02B 6/44524; G02B
6/4246; G02B 6/4403; G02B 6/4404;
G02B 6/4472; G02B 6/3885; G02B
6/44528; G02B 6/02076; G02B 6/02138;
G02B 6/02147; G02B 6/29311; G02B
6/29316; G02B 6/29319; G02B 6/29349;
G02B 6/29358; G02B 6/29361; G02B
6/29368; G02B 6/3821; G02B 6/3845;
G02B 6/3869; G02B 6/4431; G02B 6/00;
G02B 6/3807; G02B 6/3849; G02B
6/3897; G02B 6/3893; G02B 6/4413;
G02B 6/3512; G02B 6/3556; G02B
6/3803; G02B 6/448; G02B 1/005; G02B
6/04; G02B 6/262; G02B 6/32; G02B
6/359; G02B 6/4204; G02B 6/4225;
G02B 6/44; G02B 6/4401; G02B 6/4434;
G02B 6/021; G02B 6/387; G02B 6/3874;
G02B 6/3887; G02B 6/3888; G02B
6/4408; G02B 6/4411; G02B 23/2438;
G02B 23/2469; G02B 23/2476; G02B
23/2484; G02B 6/3851; G02B 6/3894;
G02B 6/42; G02B 6/4292; G02B 6/4402;
G02B 6/4405; G02B 6/4409; G02B
6/4475; G02B 6/4486; G02B 6/475;
G02B 5/0833; G02B 5/285; G02B 6/02;
G02B 6/02042; G02B 6/12007; G02B
6/24; G02B 6/3608; G02B 6/3612; G02B
6/38; G02B 6/3879; G02B 6/4201; G02B
6/4202; G02B 6/421; G02B 6/4214;
G02B 6/4249; G02B 6/43; G02B 6/4416;
G02B 6/4454; G02B 21/0036; G02B
21/22; G02B 6/02309; G02B 6/1225;
G02B 6/25; G02B 6/28; G02B 6/2861;
G02B 6/29317; G02B 6/29394; G02B
6/3588; G02B 6/381; G02B 6/3817;
G02B 6/3831; G02B 6/385; G02B
6/3854; G02B 6/3873; G02B 6/389;
G02B 6/3898; G02B 6/4251; G02B
6/4268; G02B 6/4286; G02B 6/44265;
G02B 6/4429; G02B 6/4452; G02B
6/4469; G02B 6/4471; G02B 6/4473;
G02B 6/4483; G02B 6/48; G01M
11/3118; G01M 11/00; G01M 11/3136;
G01M 11/332; G01M 11/30; G01M
11/088; G01M 3/20; G01M 11/3154;
G01M 11/333; G01M 11/335; G01M
17/013; G01M 3/06; G01M 3/2876;
G01M 1/28; G01M 11/31; G01M 11/33;
G01M 13/003; G01M 3/047; G01M
3/146; G01M 3/32; G01M 5/0041
See application file for complete search history.

(56) References Cited

U.S. PATENT DOCUMENTS

| | | | | |
|---|---|---|---|---|
| 2011/0085159 A1* | 4/2011 | Levin | | G01M 11/3154 356/73.1 |
| 2014/0279443 A1* | 9/2014 | Neeley | | G06V 10/75 702/188 |
| 2015/0234006 A1* | 8/2015 | Richards | | G01R 31/308 324/756.02 |
| 2019/0316987 A1* | 10/2019 | Eddy | | G01M 11/30 |
| 2020/0393624 A1* | 12/2020 | Dubey | | H01L 21/6835 |
| 2024/0019484 A1* | 1/2024 | Peters | | G01R 31/31905 |
| 2024/0402042 A1* | 12/2024 | Cassady | | G02B 21/362 |

FOREIGN PATENT DOCUMENTS

| | | | | | |
|---|---|---|---|---|---|
| DE | 202015100938 U1 | * | 5/2015 | | G01M 13/00 |
| JP | H02118841 U | * | 9/1990 | | |
| JP | H07294780 A | * | 11/1995 | | |
| JP | 7109856 B1 | * | 8/2022 | | G01R 31/00 |
| TW | 1518392 B | * | 1/2016 | | G02B 6/4204 |

* cited by examiner

ADAPTER PLATE
115

ADAPTER PLATE
115

ADAPTER PLATE
115

ADAPTER PLATE
115

600

RECEIVE AN INDICATION THAT AN ADAPTER PLATE
HAS BEEN MOUNTED ON THE MOUNTING PLATE
602

RECEIVE AN IMAGE OF AN IDENTIFICATION CODE
POSITIONED ON A SURFACE OF THE ADAPTER
PLATE
604

READ INFORMATION INCLUDED IN THE
IDENTIFICATION CODE
606

SET INSPECTION PARAMETERS
608

INSPECT THE TERMINATING END OF AN OPTICAL
FIBER WITH THE SET INSPECTION PARAMETERS
610

ADAPTERS FOR INSPECTION OF OPTICAL FIBER TERMINATING ENDS

TECHNICAL FIELD

The disclosure relates generally to inspection of fiber-optic terminating connectors. Particularly, the disclosure relates to an apparatus for inspecting fiber-optic terminating connectors that may automatically set inspection parameters to be used in inspecting the fiber-optic terminating connectors.

BACKGROUND

Optical fibers are often used to communicate telecommunication signals between sources and destinations because the optical fibers enable relatively high data transmission rates and bandwidths. Optical fibers also experience relatively low signal loss (attenuation) over long distances, which enables telecommunication signals to travel over long distances, oftentimes without requiring the need for frequent signal amplification. The ends of optical fibers, e.g., connectors, are often capped with ferrules to enable coupling of the optical fibers with various types of equipment. In some instances, a microscope may be used to inspect the ends of the optical fibers and connectors.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
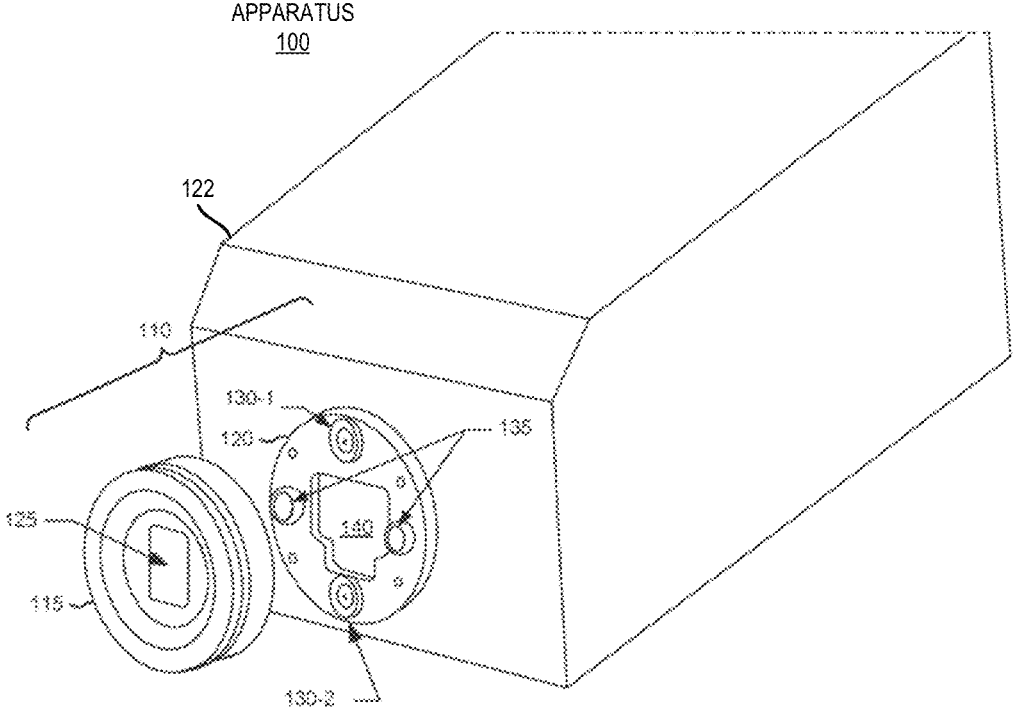
FIG. 1 illustrates a partially exploded front perspective view of an apparatus for inspecting a device under test (DUT), according to an example of the present disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes"

means includes but not limited to, the term "including" means including but not limited to, and the term "based on" means based at least in part on.

An optical fiber microscope may be used to inspect and/or analyze terminating ends of optical fibers in an optical cable. Different optical adapter systems may need to be interchanged with respect to the optical fiber microscope to inspect optical cables with different optical connectors, optical cables with optical fibers that have different fiber polishes, and/or the like. Interchanging different optical adapter systems may consume significant time and/or may delay an analysis and/or an inspection of optical fibers of an optical cable. In addition, these different optical adapter systems may include fastening mechanisms, such as screws, thread fasteners, and/or the like, which may further consume time related to interchanging optical adapter systems. Further, manufacturing multiple types of optical adapter systems for different optical cables may be complicated, thereby increasing costs related to manufacturing optical adapter systems for an optical cable microscope, decreasing a reliability of results obtained using multiple types of optical adapter systems manufactured by different manufacturers, and/or the like.

Additionally, each of the different types of optical cables may require a different reconfiguration of the optical cable microscope. In other words, a technician may reconfigure the lighting and inspection profiles manually each time there is a change in the type of optical cable that the optical cable microscope inspects. This may increase the time required to perform the inspections as well as add to the complexity of performing the inspections. Additionally, manual determination and setting of the inspection parameters may result in erroneous settings being used, which may cause faulty inspection results, thus requiring greater time and expense to be consumed in inspecting optical cables.

Disclosed herein are apparatuses and methods for automatically inspecting DUTs, e.g., terminating ends of optical fibers, connectors of optical fibers, etc. The apparatuses include a mounting tray to which an adapter plate that is to hold a DUT may removably be mounted. The adapter plate includes an identification code positioned on a surface of the adapter plate that is visible to an optical system located inside of the apparatus. The optical system includes an imager that may capture an image of the identification code and may communicate that image to a controller of the apparatus.

The controller may decode the identification code to determine the information contained in or otherwise stored in the identification code. The information may identify or may be used to identify inspection parameters to be used by the apparatus in inspecting the DUT. The inspection parameters may include certain lighting or other settings that the apparatus may use during inspection of the DUT such that the apparatus may perform the inspection with a high level of precision. In some examples, the optical system may be movable with respect to the mounting tray such that the field of view of the optical system may be moved in order to capture the image of the identification code. In any regard, the controller may automatically set the inspection parameters of the apparatus to the inspection parameters identified from the identification code. The controller may also inspect the DUT while the inspection parameters are at the settings.

Through implementation of the features of the present disclosure, the controller may automatically determine and set the inspection parameters of an apparatus, such as an optical fiber microscope, for a DUT that is currently being inspected. As a result, the features of the present disclosure may reduce or eliminate a need for a technician to manually determine and set the inspection parameters. This may also reduce the potential errors that may result from the manual determination and setting of the inspection parameters, which may also reduce the amount of power and other resources used to perform additional inspections. Moreover, by reducing potential errors, the number of optical cables that were erroneously identified as having failed the inspection may be reduced, which may reduce the number of otherwise passing optical cables from being wasted. A technical improvement afforded through implementation of the present disclosure may thus be that optical cables may be inspected in an efficient manner and that waste of resources and optical cables may be reduced.

With reference first to FIG. 1, there is illustrated a partially exploded front perspective view of an apparatus 100 for inspecting a device under test (DUT), according to an example of the present disclosure. For instance, the apparatus 100 may include a controller that may inspect an image of a DUT, e.g., an optical fiber or a terminating end of the optical fiber, a terminating end of which has been inserted into the apparatus 100. It should be understood that the apparatus 100 may include additional features and that some of the features described herein may be removed and/or modified without departing from the scope of the apparatus 100.

As shown in FIG. 1, the apparatus 100, which may also be termed an optical fiber microscope, may include a microscope (e.g., a table-top microscope or a hand-held microscope) that may be used to analyze DUTs, such as terminating ends of optical fibers. It should be understood that references made herein to an optical fiber should also be construed as being made to an optical cable, a fiber-optic cable, or the like. In any regard, apparatus 100 may include an optical probe, an optical fiber microscope, a fault locator, an optical fiber inspection microscope, and/or the like.

As further shown in FIG. 1, the apparatus 100 includes an optical adapter system 110, which is shown as including an adapter plate 115 and a mounting tray 120. According to examples, the adapter plate 115 is used to connect an optical fiber to the apparatus 100 and be mechanically and removably mounted to the mounting tray 120. The adapter plate 115 is also be termed a removable DUT adapter plate herein. The mounting tray 120 may be mechanically connected to a chassis 122 of the apparatus 100 through any suitable mechanism, such as via glue, welding, screws, bolts, magnets, permanent or quick-release type mechanisms, and/or the like.

The adapter plate 115 may include an interface 125, or, equivalently, a DUT interface 125, into which a terminating end of an optical fiber (not shown) may be inserted for inspection in the apparatus 100. In other words, the interface 125 may facilitate connection of an optical fiber to the adapter plate 115 via an optical connector associated with the optical fiber. In some implementations, the adapter plate 115 may be interchangeable with one or more other adapter plates 115. In these implementations, each of the adapter plates 115 may include a different interface 125, in which the interfaces 125 may be shaped and sized to receive and hold a different type of optical fiber connector. For instance, a first adapter plate 115 may include a first interface 125 to receive and hold a first type of optical fiber connector, e.g., a simplex connector. A second adapter plate 115 may include an interface 125 to receive and hold a second type of optical fiber connector, e.g., a duplex connector. As another example, a third adapter plate 115 may include a third interface 125 to receive and hold a third type of optical fiber connector, e.g., a multi-fiber push on connector (MPO). Other adapter plates 115 may include other interfaces for other types of optical fiber connectors.

The ability to interchange different types of adapter plates 115 on the mounting tray 120 facilitates adaption of the optical adapter system 110 for various differently configured optical connectors without replacing the optical adapter system 110. In other words, the mounting tray 120 may not need to be replaced each time a differently configured optical connector is to be inspected. Instead, the mounting tray 120 may be permanently mounted onto the chassis 122. As the mounting tray 120 may be mounted to the chassis 122 of the apparatus 100 through mechanical fasteners, removal and re-mounting of the mounting tray 120 may be time-consuming and labor intensive.

As further shown in FIG. 1, the mounting tray 120 of the optical adapter system 110 may include a set of disk magnets 130 (e.g., disk magnets 130-1 and 130-2). In some implementations, the set of disk magnets 130 may be associated with mechanically connecting the adapter plate 115 to the mounting tray 120. For example, the set of disk magnets 130 may magnetically connect to a metal plate associated with the adapter plate 115 (e.g., located on a back side of the adapter plate 115) to removably connect the adapter plate 115 to the mounting tray 120. Additionally, or alternatively, the set of disk magnets 130 may be associated with facilitating movement of the adapter plate 115 between multiple positions associated with different optical fiber polishes. For example, a first metal plate associated with the adapter plate 115 may be magnetically connected to the disk magnet 130-1 when in a first position of the multiple positions, and a second metal plate associated with the adapter plate 115 may be magnetically connected to the disk magnet 130-2 when in a second position of the multiple positions. In some implementations, the set of disk magnets 130 may be in another shape. For example, the set of disk magnets 130 may be in the shape of a square, a rectangle, a sphere, a triangle, and/or the like. In addition, in some implementations, the set of disk magnets 130 may be omitted.

According to examples, the mounting tray 120 of the optical adapter system 110 may include a set of sphere magnets 135 (e.g., shown as a pair of sphere magnets 135). In some implementations, the set of sphere magnets 135 may be associated with mechanically connecting the adapter plate 115 to the mounting tray 120 of the optical adapter system 110. For example, a respective portion of a metal plate associated with the adapter plate 115 may magnetically connect to the set of sphere magnets 135 to mechanically connect the adapter plate 115 to the mounting tray 120. Additionally, or alternatively, the set of sphere magnets 135 may be associated with facilitating movement of the adapter plate 115 between multiple positions associated with different optical fiber polishes. For example, rounded surfaces of the set of sphere magnets 135 may facilitate movement of the adapter plate 115 between the multiple positions. In some implementations, the set of sphere magnets 135 may be in another shape. For example, the set of sphere magnets 135 may be in the shape of a hemisphere, a cylinder, a geodesic sphere, and/or the like.

As further shown in FIG. 1, the mounting tray 120 includes an opening 140 through which a portion of the adapter plate 115 and the terminating end of the optical fiber mounted in the adapter plate 115 are visible from within the chassis 122. As a result, the opening 140 facilitates capture of images of the portion of the adapter plate 115 and the terminating end of the optical fiber when the optical fiber is mechanically connected to the interface 125 of the adapter plate 115. For example, the opening 140 may facilitate the analysis of the terminating end of the optical fiber by providing an unobstructed field of view to the terminating end of the optical fiber.

Although FIG. 1 was described as including various sets of magnets to removably connect the adapter plate 115 and the mounting tray 120, the implementations may apply equally to types of attachment structures other than magnets. For example, rather than including various sets of magnets, the adapter plate 115 and the mounting tray 120 may include various sets of hook-and-loop fasteners, press-fit connectors, snap connectors, and/or the like. Additionally, although the adapter plate 115 and the mounting tray 120 are depicted as having circular shapes, it should be understood that the adapter plate 115 and the mounting tray 120 may have other shapes, such as a rectangular shape, an oval shape, a hexagonal shape, or the like.

Figure 2A:
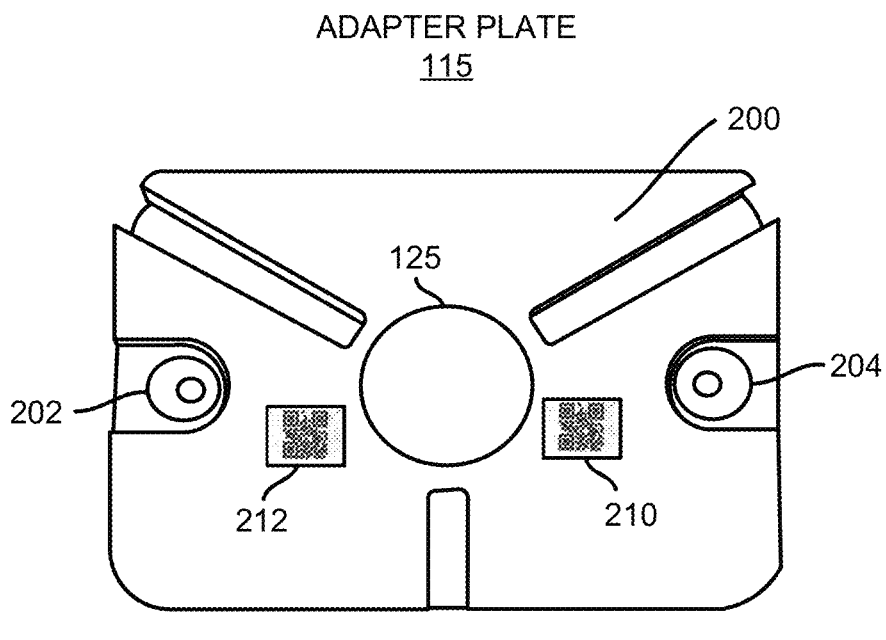
FIGS. 2A and 2B, respectively, show front elevational views of adapter plates for use in an optical adapter system of the apparatus depicted in FIG. 1, according to an example of the present disclosure.
Figure 2B:
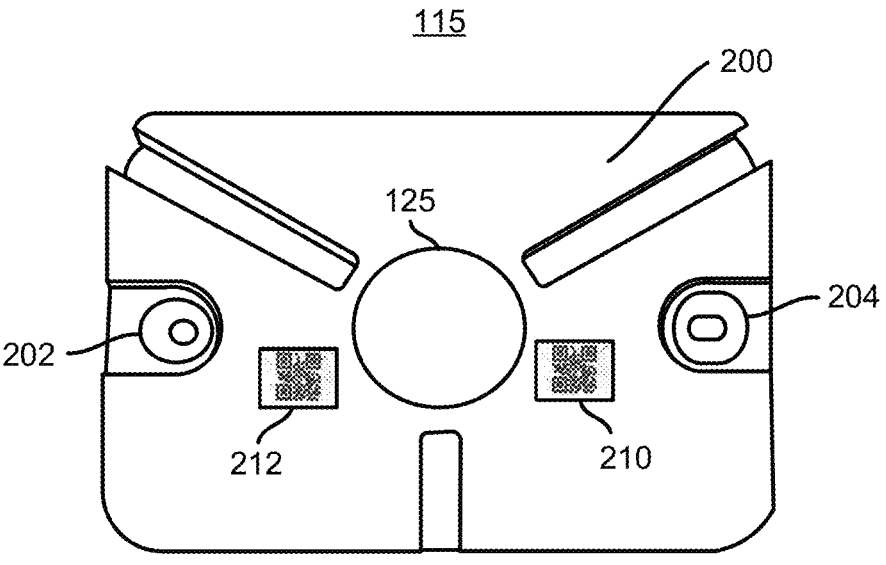

FIGS. 2A and 2B, respectively, show front elevational views of adapter plates 115 for use in an optical adapter system 110 of the apparatus 100 depicted in FIG. 1, according to examples of the present disclosure. The adapter plates 115 depicted in FIGS. 2A and 2B may be equivalent to the adapter plate 115 depicted in FIG. 1 and may thus include each of the features discussed herein with respect to that adapter plate 115. However, the adapter plates 115 depicted in FIGS. 2A and 2B are shown as having a generally rectangular shape, although it should be understood that the adapter plates 115 may have other shapes without departing from scopes of the present disclosure.

FIGS. 2A and 2B show a surface 200 of the adapter plate 115 that is to face toward the mounting tray 120 when the adapter plate 115 is mounted to the mounting tray 120, according to an example. As shown, the adapter plate 115 may include a first curved surface 202 and a second curved surface 204 that are to mate with respective sphere magnets 135 on the mounting tray 120 when the adapter plate 115 is mounted on the mounting tray 120. In other words, the first curved surface 202 and the second curved surface 204 may be recessed sections on the face of the adapter plate 115 into which respective ones of the sphere magnets 135 may be inserted such that the adapter plate 115 may be held in mechanical engagement with the mounting tray 120.

According to examples, and as particularly shown in FIG. 2B, one of the curved surfaces 202, 204, e.g., the first curved surface 202, may have a symmetric, e.g., spherical, surface of revolution and another one of the curved surfaces 202, 204, e.g., the second curved surface 204, may have an asymmetric, e.g., elliptical, surface of revolution. For instance, the second curved surface 204 may have an elongated shape in which the width of the second curved surface 204 is greater than the height of the second curved surface 204. This configuration of the second curved surface 204 may enable a proper kinematic mount to be achieved.

The angled surface of revolution of the first curved surface 202 may mate directly with a sphere magnet 135. However, the elliptical shape of the second curved surface 204 may enable the adapter plate 115 to be tolerant of small lateral placement errors of the sphere magnets 135. In this way, the defined tilting axis of the adapter plate 115 may be preserved, but the tilting axis may be insensitive to small errors (less than the length) of sphere magnet 135 lateral separation.

According to examples, the adapter plate 115 includes an identification code 210 positioned on the adapter plate 115 to be visible to an optical system inside of the chassis 122 of the apparatus 100. An example of an identification code 210 position on the adapter plate 115 is shown in FIGS. 2A and 2B. The identification code 210 represents or otherwise stores information pertaining to the type of interface 125 that the adapter plate 115 includes. In other words, the identification code 210 may store information regarding the type of optical fiber connector the interface 125 is to receive. For instance, the identification code 210 may store information regarding whether the connector is a simplex connector, a duplex connector, an MPO, or the like. In addition, or in other examples, the identification code 210 may represent or otherwise store information pertaining to the inspection parameters that are to be used during inspection of the DUT.

In some examples, the identification code 210 may be provided adjacent to the interface 125 such that the identification code 210 may not be covered by the mounting tray 120 when the adapter plate 115 is supported on the mounting tray 120. In other words, the identification code 210 may be positioned on the surface 200 of the adapter plate 115 such that the identification code 210 may be visible through the opening 140 in the mounting tray 120. In some examples, a plurality of identification codes 210, such as a second identification code 212, may be provided on the surface 200 of the mounting tray 120. For instance, additional identification codes 210 may be provided at additional locations around the interface 125 to increase the likelihood of an optical system in the apparatus 100 capturing an image of one or more of the identification codes 210.

In any of the examples discussed herein, the identification code 210 may be any suitable type of code that may be imaged and read by a machine. For instance, the identification code 210 may be a quick response (QR) code, a barcode, a datamatrix, text, symbols, and/or the like. In addition, the identification code 210 may be provided on the surface 200 of the adapter plate 115 through any suitable manner. Some examples may include, etching or inscribing the identification code 210 into the surface 200, printing the identification code 210 on a sticker and adhering the sticker onto the surface 200, printing the identification code 210 directly onto the surface 200, and/or the like.

Figure 3A:
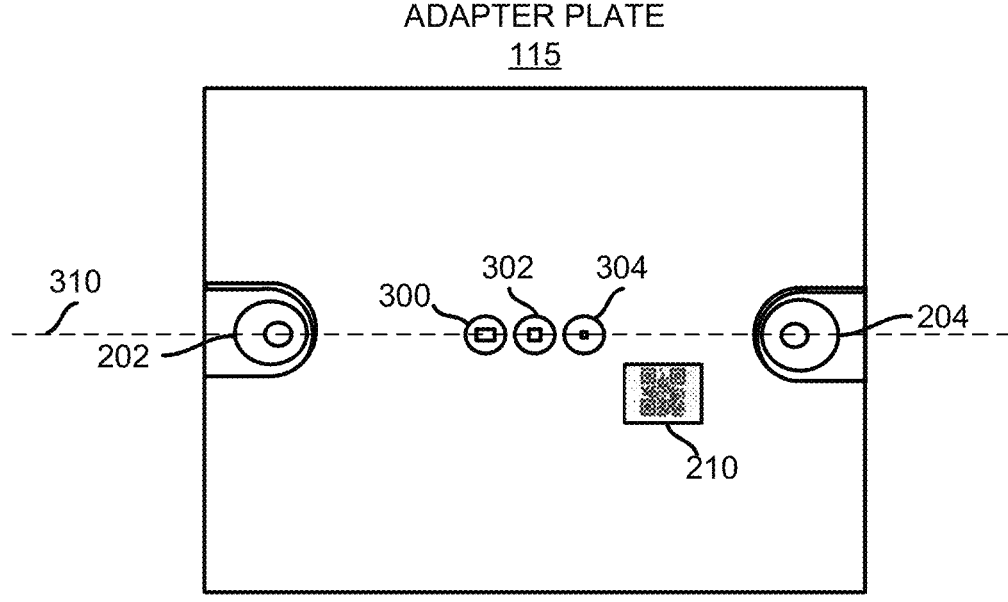
FIGS. 3A and 3B, respectively, show front elevational views of adapter plates for use in an optical adapter system of an apparatus, according to examples of the present disclosure.
Figure 3B:
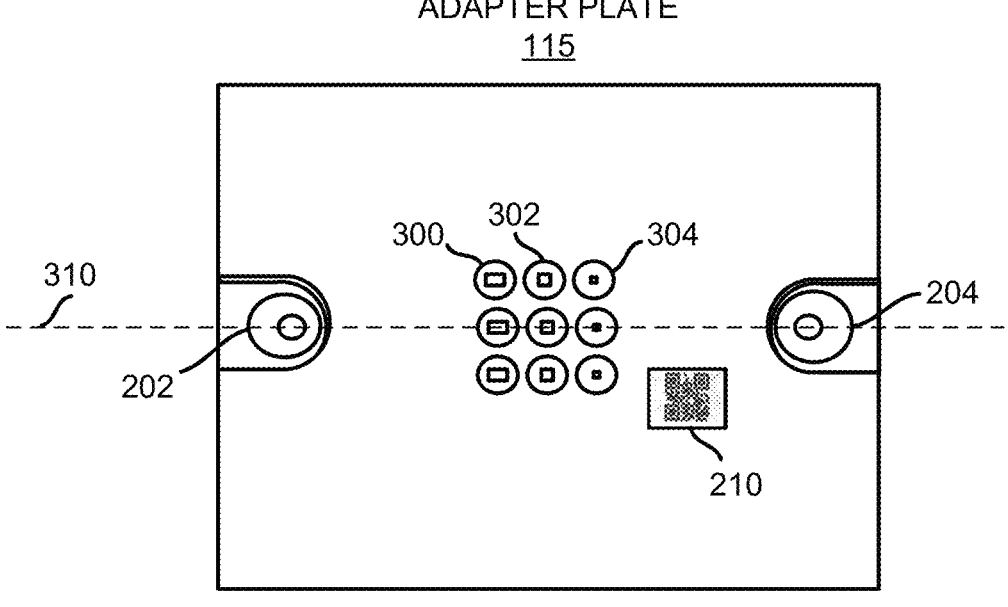

FIGS. 3A and 3B, respectively, show front elevational views of adapter plates 115 for use in an optical adapter system 110 of an apparatus 100, according to examples of the present disclosure. The adapter plates 115 depicted in FIGS. 3A and 3B differ from the adapter plates 115 depicted in FIGS. 1, 2A, and 2B in that these adapter plates 115 may include multiple interfaces 300-304. In this regard, the adapter plates 115 depicted in FIGS. 3A and 3B may support multiple optical fibers to thus enable the multiple optical fibers to be inspected.

In the example shown in FIG. 3A, the interfaces 300-304 may be aligned along a common horizontal axis 310. The interfaces 300-304 may be aligned in this manner such that the axis of pivot (horizontal axis 310) is common to the center of the connectors inserted into the interfaces 300-304 and the axis of pivot. In such an arrangement, the ends of the connectors stay in the focal plane of the optical system and are not translated in nor out of the focal plane. This may save time, and may ensure that both angled connector types may be within the focal-range of the optical system. If inspecting a planar/flat connector (FC/PC) then it may not matter if the connector is colinear with the horizontal axis 310. However, in the case of angled connectors, for instance, FC/APC, if the connector end-face is not colinear with the horizontal axis 310, then substantial translation in the focal direction may occur.

In other examples, the interfaces 300-304 may be arranged in other configurations such as is shown in FIG. 3B. In addition, each of the interfaces 300-304 is depicted as being configured to accept a different type of connector. For instance, a first interface 300 may accept an MPO connector, a second interface 302 may accept a simplex connector having a first dimension, and a third interface 304 may accept a simplex connecting having a second dimension. In other examples, some or all of the interfaces 300-304 may accept the same type of connector.

Although FIGS. 3A and 3B show certain numbers of interfaces 300-304 in the adapter plates 115, it should be understood that the adapter plates 115 may include any suitable number of interfaces 300-304 without departing from scopes of the present disclosure. Additionally, although FIGS. 3A and 3B show certain types of interfaces 300-304 in the adapter plates 115, it should be understood that the adapter plates 115 may include any combination of types of interfaces 300-304 without departing from scopes of the present disclosure.

Figure 4:
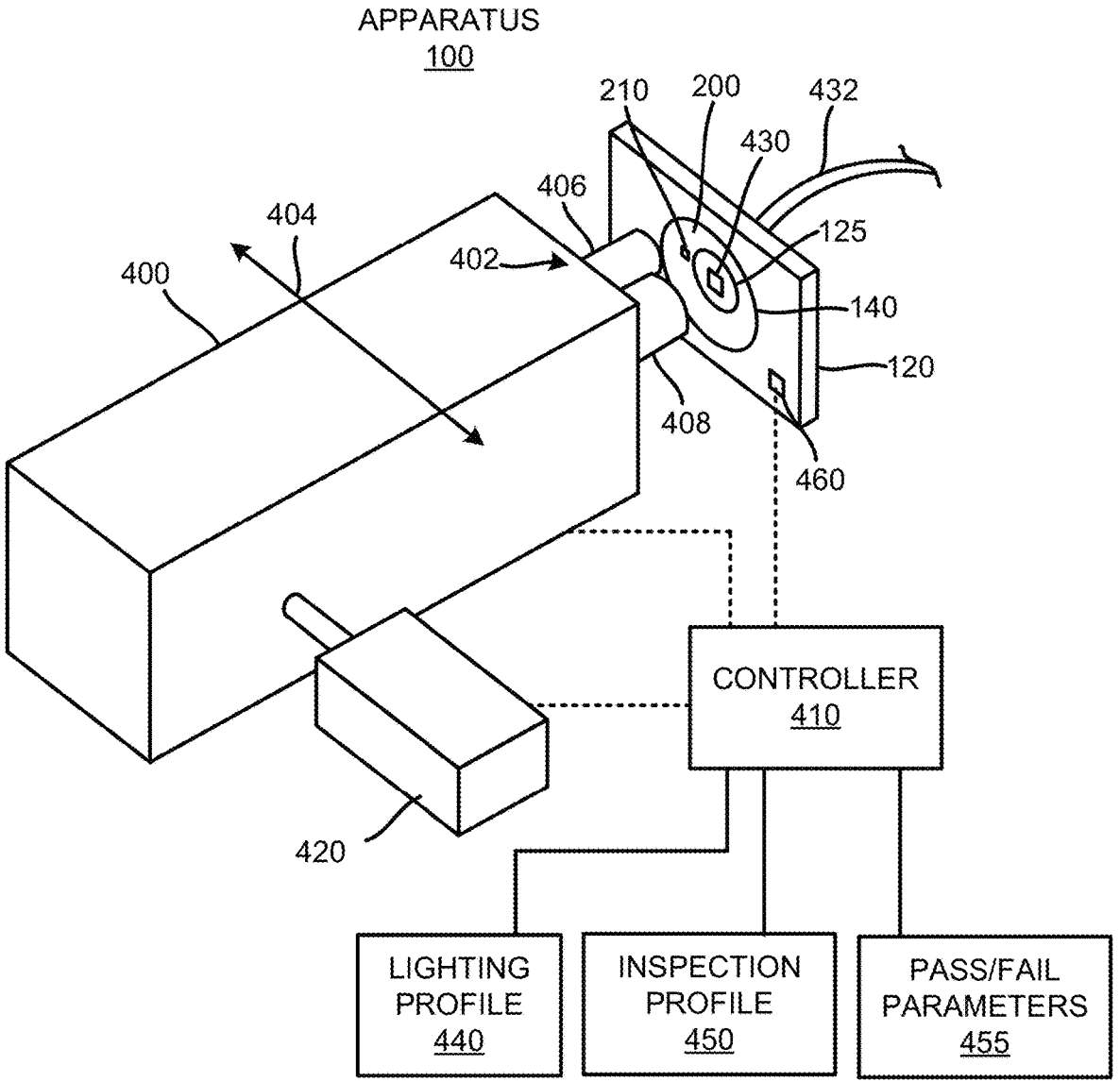
FIG. 4 depicts a block diagram of an interior of the apparatus depicted in FIG. 1, in accordance with an example of the present disclosure.

FIG. 4 depicts a block diagram of an interior of the apparatus 100 depicted in FIG. 1, according to an example of the present disclosure. For instance, FIG. 4 depicts the apparatus 100 with the chassis 122 removed, in which the components of the apparatus 100 are depicted in a simplified manner for purposes of illustration. FIG. 4 also depicts the mounting tray 120 and the surface 200 of the adapter plate 115. It should be understood that the apparatus 100 depicted in FIG. 4 may include additional features and that some of the features described herein may be removed and/or modified without departing from the scope of the apparatus 100.

As shown, the apparatus 100 may include an optical system 400, a controller 410, and an actuator 420. The optical system 400 may include a microscope or other type of optical imaging device. For instance, the optical system 400 may include a lens assembly 402 through which images of a DUT 430, e.g., a terminating end of an optical fiber 432 and connector, may be captured. The lens assembly 402 may include optical components that may enable magnification of the images of the DUT 430 and the identification code 210.

The controller 410 may be a semiconductor-based microprocessor, a central processing unit (CPU), an application specific integrated circuit (ASIC), a field-programmable gate array (FPGA), and/or other hardware device. In particular examples, the controller 410 is an FPGA. In some examples in which the controller 410 is a microprocessor or a CPU, the controller 410 may access or may include a memory (not shown), which may also be termed a computer readable medium. In these examples, the memory may be, for example, a Random Access memory (RAM), an Electrically Erasable Programmable Read-Only Memory (EEPROM), a storage device, or the like. In some examples, the memory is a non-transitory computer readable storage medium, where the term "non-transitory" does not encompass transitory propagating signals. In addition, the memory may have stored thereon machine-readable instructions that the controller 410 may execute.

The actuator 420 may include any suitable type of device that may move the optical system 400 as a whole or the lens assembly 402 with respect to the adapter plate 115. For instance, the actuator 420 may pan the lens assembly 402 laterally as denoted by the arrow 404, tilt the lens assembly 402 such that the field of view moves vertically, rotationally, and/or the like. In addition or in other examples, the lens assembly 402 may include a flip-in mirror (not shown), and the actuator 420 may momentarily flip into a beam to change the field-of-view of the lens assembly 402. For instance, if two different magnification microscope objectives are used, a mirror may be used to flip in and out to change the beam direction, may change the field-of-view size based on the microscope objective lens types. Alternatively, the actuator 420 may move the mounting tray 120 itself, for instance, with the help of adjustment screws in the X (horizontal) and the Y (vertical) axis.

According to examples, the lens assembly 402 may include a sufficiently large field of view to enable image capture of the identification code 210 on the surface 200 of the adapter plate 115. In other examples, such as in instances in which the field of view of the lens assembly 402 is insufficiently large to capture an image of the identification code 210, the lens assembly 402 may be moved in one or more directions to capture an image of the identification code 210. For instance, the controller 410 may control the actuator 420 to cause the lens assembly 402 to perform a scanning operation, by moving the lens assembly 402 horizontally and/or vertically, by tilting the lens assembly 402 horizontally and/or vertically, or the like. Additionally, the lens assembly 402 may capture images of various sections of the surface 200 of the adapter plate 115 and the DUT 430 while the lens assembly 402 is in multiple positions with respect to the adapter plate 114. The controller 410 may receive the captured images of the various sections of the surface 200, which may include an image of the identification code 210, to obtain the image of the identification code 210.

In some examples, the lens assembly 402 may include multiple lens subassemblies, such as a first lens subassembly 406 and a second lens subassembly 408. The first lens subassembly 406 may include a first magnification level, e.g., may apply a first magnification level on images viewed through the first lens subassembly 406. The second lens subassembly 408 may include a second magnification level, e.g., may apply a second magnification level on images viewed through the second lens subassembly 408. In some examples, the controller 410 may control the actuator 420 to move the lens assembly 402 to position the first lens subassembly 406 to capture an image of the identification code 210 and/or the DUT 430 during a first time period and to position the second lens subassembly 408 to capture an image of the identification code 210 and/or the DUT 430 during a second time period.

As another example, the controller 410 may control the actuator 420 to position the lens subassembly having the wider field of view to capture a wider field of view image such that there may be a greater likelihood of the captured image including the identification code 210. In addition, the controller 410 may control the actuator 420 to position the lens subassembly having the smaller field of view, e.g., the greater magnification level, to capture an image of the DUT 430 during inspection of the DUT 430.

In any of the examples discussed herein, the controller 410 may access an image of the identification code 210 and may decode information included in or stored in the identification code 210. As discussed herein, and according to examples, the information may include an identification of the type DUT 430 that the adapter plate 115 is configured to support. In examples in which the adapter plate 115 supports multiple DUTs 430, the information may include identifications of the placements and the types of DUTs 430, e.g., the interfaces 300-304 (FIGS. 3A and 3B), supported by the adapter plate 115. As such adapter plates 115 that are to support different types of DUTs 430 may include identification codes 210 that store information pertaining to those adapter plates 115.

In these examples, the controller 410 may decode the information stored in the identification code 210 to determine the type or types of DUTs 430 supported by the adapter plate 115. Based on the decoded information, the controller 410 may set inspection parameters to be used for the DUT 430 or the multiple DUTs 430. The inspection parameters may include at least one of a lighting profile 440, an inspection profile 450, pass/fail parameters 455, or the like, of the optical system 400 to be used in inspecting the DUT(s) 430. The lighting profile 440 may include the amount of illumination to be applied onto the DUT 430 during testing, which may be controlled by controlling the current applied to the diodes, controlling which segments of a segmented LED are activated, controlling the wavelength selection of a multi-wavelength source, selecting the lighting modality (e.g., axial, darkfield, or other technique), or the like. The inspection profiles may be for FC/PC simplex connector, an MPO connector type, or a specialized silicon Vgroove assembly, and/or the like.

Thus, for instance, the controller 410 may access a table or other set of data that may indicate the lighting profile 440, inspection profile 450, pass/fail parameters 455, and/or the like, to be set for the DUT 430 to determine the lighting profile 440, inspection profile 450, pass/fail parameters 455, and/or the like, to be set. The data corresponding to the lighting profiles 440, inspection profiles 450, pass/fail parameters 455, etc., may have been determined through testing. For instance, the data may be derived from settings that may have resulted in optimized results during the testing. In some examples, the inspection parameters may be selected to enable optimized inspection of the DUT 430 and the inspection parameters may differ for different DUTs 430.

In addition or in other examples, the identification code 210 may have stored thereon information identifying the lighting profile 440, the inspection profile 450, the pass/fail parameters 455, and/or the like, to be used for the DUT 430 supported by the adapter plate 115. In instances in which the adapter plate 115 supports multiple DUTs 430, the identification code 210 may store information identifying multiple lighting profiles 440, inspection profiles 450, the pass/fail parameters, and/or the like, for the multiple DUTs 430.

According to examples, the apparatus 100 may include a detection system 460 to detect whether the adapter plate 115 is mounted to the mounting tray 120. The detection system 460 may automatically detect when the adapter plate 115 is mounted on and removed from the mounting tray 120. The detection system 460 may also output a signal to the controller 410, which the controller 410 may use to determine whether the adapter plate 115 is mounted to the mounting tray 120. In some examples, upon installation of the adapter plate 115, the controller 410 may use a logic-change of the detection system 460 to initiate a search for the identification code 210 provided on the surface 200 of the adapter plate 115.

In addition or alternatively, the controller 410 may use the logic-change to disable panning of the optical system 400. For instance, the controller 410 may block panning of the optical system 400 based on a detection that the adapter plate 115 has been removed from the mounting tray 120. Preventing the optical system 400 from panning while the adapter plate 115 is removed may function as a safety feature as the panning may potentially harm a user.

The detection system 460 may include any suitable type of system that may detect whether an adapter plate 115 is mounted to the mounting tray 120. For instance, the detection system 460 may include a reflective photointerruptor (detector/emitter pair) that may, for instance, emit a light from the mounting tray 120 and a detector that may detect whether the light is reflected back from the adapter plate

115. In other examples, the detection system 460 may include a transmissive photointerruptor (detector/emitter pair) that may detect whether a light beam emitted across the mounting tray 120 is broken or not. In yet other examples, the detection system 460 may detect whether there is electrical continuity, for instance, between two electrodes on the mounting tray 120 as would occur when the adapter plate 115 is mounted to the mounting tray 120. In yet other examples, the adapter plate 115 may include a tag, e.g., a radio frequency identification device (RFID) tag, and the detection system 460 may include a wireless transmission device, e.g., an RFID reader. In these examples, the detection system 460 may detect that the adapter plate 115 has been mounted to the mounting tray 120 when the detection system 460 receives a signal from the tag on the adapter plate 115. In still other examples, the detection system 460 may include other types of detection components, such as mechanical detection components in which a switch may be triggered when the adapter pate 115 is mounted on the mounting tray 120.

Figure 5:
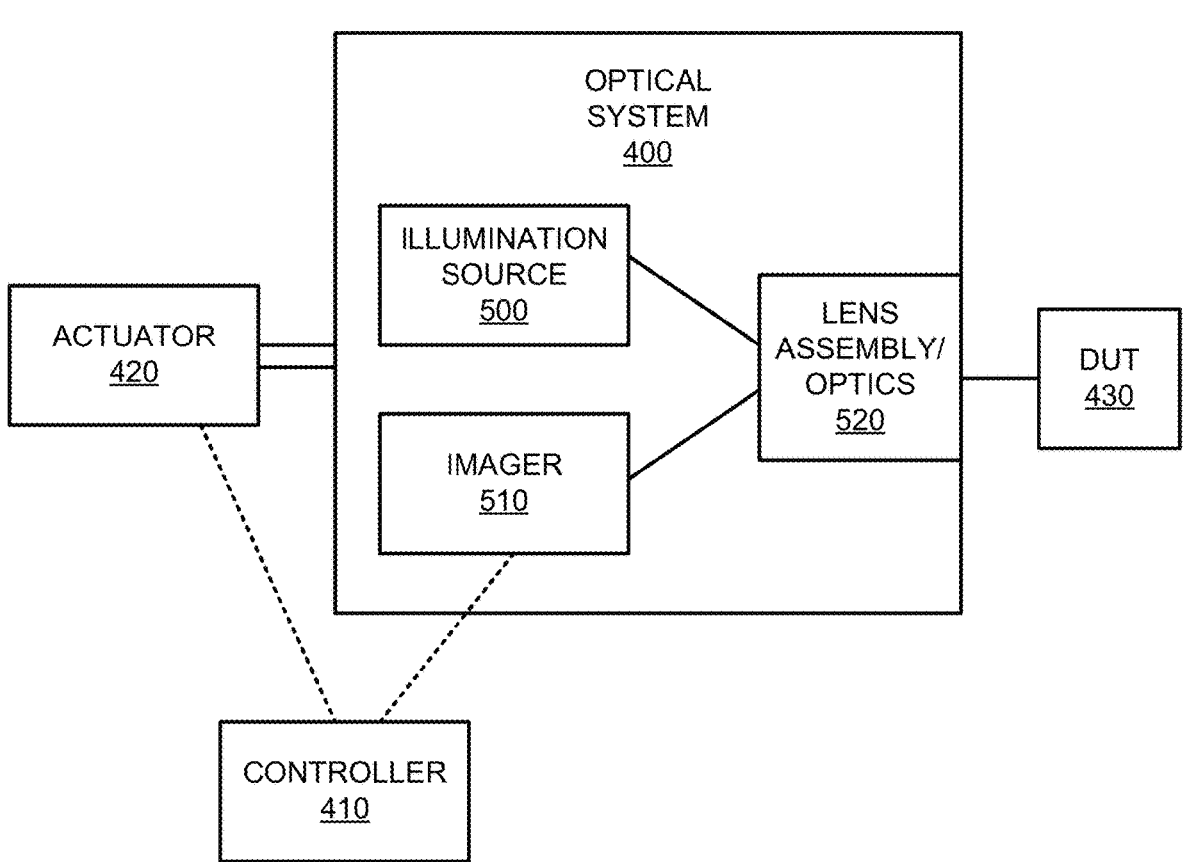
FIG. 5 illustrates a block diagram of the apparatus depicted in FIGS. 1 and 4, according to an example of the present disclosure.

FIG. 5 depicts a block diagram of the apparatus 100 depicted in FIGS. 1 and 4, according to an example of the present disclosure. It should be understood that the apparatus 100 depicted in FIG. 5 may include additional features and that some of the features described herein may be removed and/or modified without departing from the scope of the apparatus 100. The description of the apparatus 100 depicted in FIG. 5 is made with reference to the features depicted in FIG. 4 for purposes of illustration.

As shown, the apparatus 100 may include an optical system 400, a controller 410, and an actuator 420. The optical system 400 may include an illumination source 500, an imager 510, and a lens assembly/optics 520. The illumination source 500 may be any suitable type of illumination device for an optical system, such as a light emitting diode, an incandescent lamp (such as a tungsten lamp), a halogen lamp, an arc lamp, and/or the like. The illumination source 500 may emit light rays toward the lens assembly/optics 520 and the lens assembly/optics 530 may direct the light rays toward the DUT 430 held in an adapter plate 115 as discussed herein. The lens assembly/optics 530 may include optical components, such as lenses, mirrors, etc., that may also direct light reflected from the DUT 430 to the imager 510.

The imager 510 may be an electronic device, e.g., a sensor, that may convert incoming light into digital signals. The imager 510 may communicate the digital signals to the controller 410, which may process the digital signals to create digital images. As discussed herein, the digital images may include an image of an identification code 210 that the controller 410 may read. Based on information contained in the identification code 210, the controller 410 may automatically set inspection parameters for the inspection of the DUT 430. In addition, the controller 410 may inspect the DUT 430 using the image of the DUT 430. The controller 410 may further output an indication as to whether the DUT 430 has passed or failed the inspection.

Figure 6:
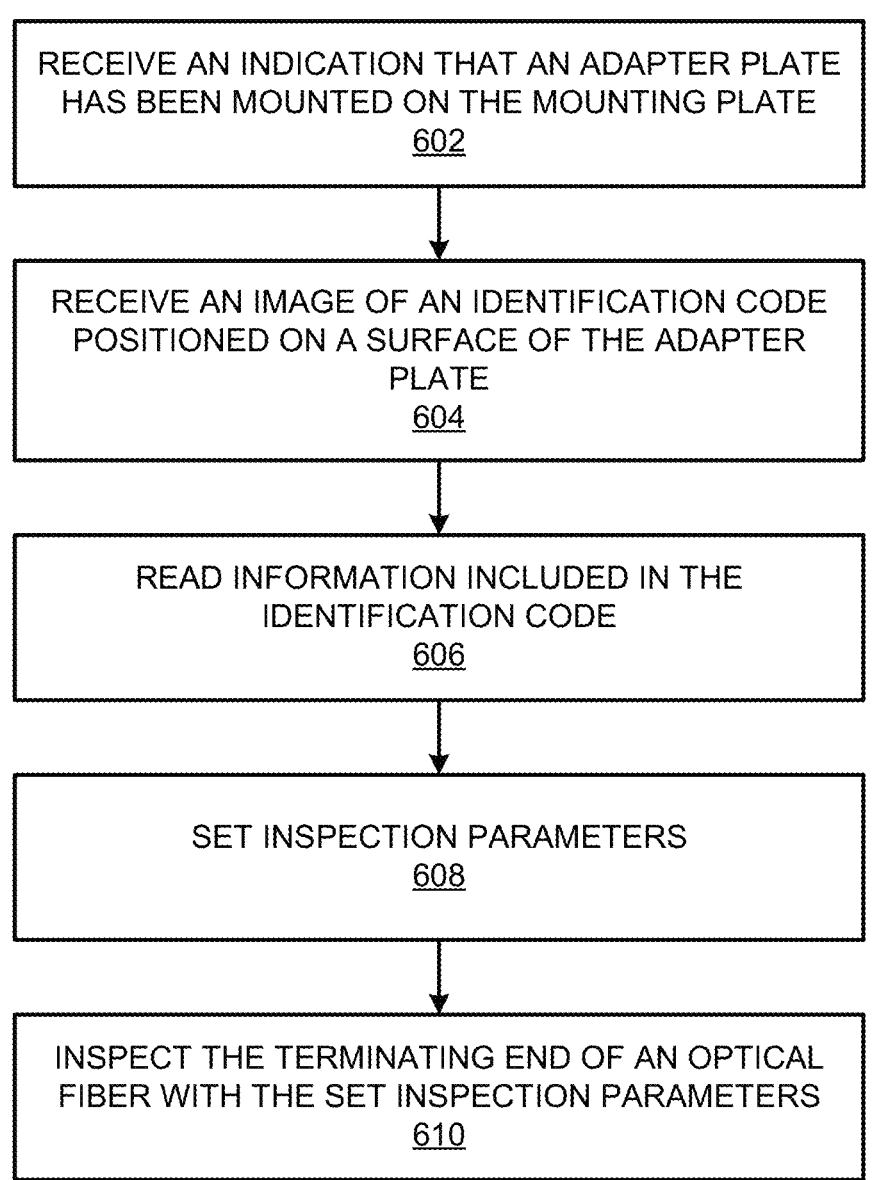
FIG. 6 illustrates a flow diagram of a method for inspecting a terminating end of an optical fiber, according to an example of the present disclosure.

Various manners in which the controller 410 may operate are discussed in greater detail with respect to the method 600 depicted in FIG. 6. Particularly, FIG. 6 illustrates a flow diagram of a method 600 for inspecting a terminating end 430 of an optical fiber 432, according to an example of the present disclosure. It should be understood that the method 600 may include additional operations and that some of the operations described therein may be removed and/or modified without departing from the scope of the method 600.

The description of the method 600 is made with reference to the features depicted in FIGS. 1-5 for purposes of illustration.

At block 602, the controller 410 may receive an indication that an adapter plate 115 has been mounted on the mounting tray 120. In some examples, the controller 410 may receive the indication from the detection system 460 that the adapter plate 115 has been mounted to the mounting tray 120. Particularly, for instance, the controller 410 may determine, from the detection system 460, when the adapter plate 115 is initially mounted on the mounting tray 120. In response to this determination, the controller 410 may initiate an identification code 210 reading operation. The identification code 210 reading operation may include causing the optical system 400 to capture an image of the identification code 210 from a surface 200 of the adapter plate 115. This operation may also include causing, by the controller 410, an actuator 420 to position the identification code 210 within a field of view of a lens assembly 402 of the optical system 400. For instance, the controller 410 may control the actuator 420 to tilt the lens assembly 402, pan the lens assembly 402, or the like, to position the identification code 210 within the field of view of the lens assembly 402.

In other examples, the controller 410 may receive the indication from a user, such as, through an input of an instruction by the user to initiate an inspection operation. In response to receipt of this instruction, the controller 410 may initiate an identification code 210 reading operation.

At block 604, the controller 410 may receive an image of an identification code 210 from an imager 510 of an optical system 400. As discussed herein, the identification code 210 may be positioned on a surface of an adapter plate 115 including an interface 125 to support the terminating end 430 of the optical fiber 432. As also discussed herein, the adapter plate 115 may removably be supported on a mounting tray 120.

According to examples, the controller 410 may prevent the actuator 420 from moving the lens assembly 402 when the controller 410 determines, from the detection system 460, that the adapter plate 115 has been removed from the mounting tray 120. By preventing the lens assembly 402 from moving when the adapter plate 115 has been removed from the mounting tray 120, potential harm to a user by the moving lens assembly 402 may be avoided.

At block 606, the controller 410 may read information included in the identification code 210. As discussed herein, the information identifies or is to be used to identify inspection parameters to be used in inspecting the terminating end 430 of the optical fiber 432. For instance, the information may identify the type of terminating end 430 that the adapter plate 115 is to support. In these instances, the controller 410 may determine the inspection parameters to be used based on a correlation between types of terminating ends and inspection parameters. In addition or in other examples, the information may identify the inspection parameters to be used. In these instances, the controller 410 may determine the inspection parameters from the information included in the identification code 210 directly. In any of these examples, the inspection parameters may be tailored for the optical fiber 432, such as by having lighting conditions that may maximize capture of images of the terminating ends such that the images may accurately be used to inspect the terminating ends 430 of the optical fibers 432.

At block 608, the controller 410 may set the inspection parameters to be used in inspecting the terminating end 430 of the optical fiber 432 to the identified inspection parameters. This may include setting, for instance, a lighting profile, an inspection profile, pass/fail parameters, etc., of an apparatus 100 during inspection of the terminating end 430 of the optical fiber 432.

At block 610, the controller 410 may inspect the terminating end 430 of the optical fiber 432 with the set inspection parameters. For instance, the controller 410 may cause the terminating end 430 of the optical fiber 432 to be within a field of view of the lens assembly 402. The controller 410 may also receive one or more images of the terminating end 430 of the optical fiber 432 from an imager 510 of the optical system 400. The controller 410 may further inspect the terminating end 430 of the optical fiber 432 from the received images. For instance, the controller 410 may determine whether the terminating end 430 of the optical fiber 432 has passed or failed the inspection.

The controller 410 may further output an indication as to whether or not the terminating end 430 of the optical fiber 432 has passed or failed the inspection. The controller 410 may output the indication via a visual alarm, via an audible alarm, via a display, etc.

In some examples in which the adapter plate 115 supports multiple terminating ends 430 of optical fibers 432, the identification code 210 may include information pertaining to the multiple ones of the terminating ends 430 of optical fibers 432. For instance, the information may identify the locations of each of the terminating ends and the types of the terminating ends. The controller 410 may use this information to set appropriate inspection parameters for each of terminating ends 430.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. An apparatus for inspecting a an optical fiber terminating end, the apparatus comprising:

an optical system to capture images of the optical fiber terminating end when the optical fiber terminating end is positioned in a removable adapter plate for inspection in the apparatus;

a mounting tray having an opening, wherein the mounting tray is to support the removable adapter plate, wherein the removable adapter plate includes an identification code positioned on the removable adapter plate to be visible to the optical system through the opening in the mounting tray, and wherein the optical system is to capture an image of the identification code;

a controller to:

receive the image of the identification code from the optical system;

decode information included in the identification code; and set at least one of a lighting profile, an inspection profile, and pass/fail parameters of the optical system to be used in inspecting the optical fiber terminating end based on the decoded information.

2. The apparatus of claim 1, wherein the removable adapter plate includes an interface into which the optical fiber terminating end is to be inserted, and wherein the identification code is positioned adjacent to the interface.

3. The apparatus of claim 2, wherein the identification code is positioned on a first side of the interface and a second identification code is positioned on a second side of the interface.

4. The apparatus of claim 1, wherein the optical system comprises a lens assembly through which the image of the identification code is to be captured, the apparatus further comprising:

an actuator to move the lens assembly, wherein the controller is to control the actuator to move the lens assembly to position the identification code within a field of view of the lens assembly to capture the image of the identification code.

5. The apparatus of claim 4, wherein the lens assembly comprises a first lens subassembly having a first magnification level and a second lens subassembly having a second magnification level, and wherein the controller is to control the actuator to move the lens assembly to position the first lens subassembly to capture an image of the optical fiber terminating end during a first time period and to position the second lens subassembly to capture an image of the optical fiber terminating end during a second time period.

6. The apparatus of claim 5, wherein the second lens subassembly has a lower magnification level than the first lens subassembly and the controller is to control the actuator to move the lens assembly to position the second lens subassembly in a position to capture the image of the identification code.

7. The apparatus of claim 1, wherein the mounting tray comprises a first sphere magnet and a second sphere magnet, wherein the removable adapter plate comprises a first curved surface to mate with the first sphere magnet and a second curved surface to mate with the second sphere magnet, and wherein the first curved surface has a symmetric surface of revolution and the second curved surface has an asymmetric surface of revolution.

8. The apparatus of claim 1, wherein the removable adapter plate comprises a plurality of interfaces, at least one of the plurality of interfaces to support a first type of optical fiber terminating end and at least another one of the plurality of interfaces to support a second type of optical fiber.

9. The apparatus of claim 1, wherein the optical system comprises a lens assembly through which the image of the identification code is to be captured, the apparatus further comprising:

an actuator to move the lens assembly;

a detection system to detect whether the removable adapter plate is mounted to the mounting tray; and wherein the controller is to:

initiate an identification code reading operation in response to a detection by the detection system that the removable adapter plate is mounted to the mounting tray; and lock the actuator from moving in response to a detection by the detection system that the removable adapter plate is not mounted to the mounting tray.

10. The apparatus of claim 9, wherein the detection system comprises a photointerrupter.

11. An apparatus for inspecting a terminating end of an optical fiber, the apparatus comprising:

a mounting tray having an opening, wherein the mounting tray is to removably support a plurality of types of adapter plates, wherein the plurality of types of adapter plates are to support various types of optical fibers and include respective identification codes on the adapter plates;

an optical system to capture images of the terminating end of an optical fiber inserted into an adapter plate of the plurality of types of adapter plates mounted on the mounting tray and an identification code on the adapter plate through the opening in the mounting tray;

a controller to:

decode information included in the identification code; and determine, from the decoded information, a type of the optical fiber inserted in the adapter plate; and based on the determined type of the optical fiber, set at least one of a lighting profile, an inspection profile, and pass/fail parameters of the optical system to be used in inspecting the terminating end based on the decoded information.

12. The apparatus of claim 11, wherein the adapter plate includes an interface into which the terminating end of an optical fiber is to be inserted, and wherein the identification code is positioned adjacent to the interface.

13. The apparatus of claim 11, wherein the optical system comprises a lens assembly through which the image of the identification code is to be captured, the apparatus further comprising:

an actuator to move the lens assembly, wherein the controller is to control the actuator to move the lens assembly to position the identification code within a field of view of the lens assembly to capture the image of the identification code.

14. The apparatus of claim 13, wherein the lens assembly comprises a first lens subassembly having a first magnification level and a second lens subassembly having a second magnification level, and wherein the controller is to control the actuator to move the lens assembly to position the first lens subassembly to capture an image of the optical fiber during a first time period and to position the second lens subassembly to capture an image of the optical fiber during a second time period.

15. The apparatus of claim 11, wherein the mounting tray comprises a first sphere magnet and a second sphere magnet, wherein the adapter plate comprises a first curved surface to mate with the first sphere magnet and a second curved surface to mate with the second sphere magnet, and wherein the first curved surface has a symmetric surface of revolution and the second curved surface has an asymmetric surface of revolution.

16. The apparatus of claim 11, wherein the adapter plate comprises a plurality of interfaces, at least one of the plurality of interfaces to support a first type of optical fiber and at least another one of the plurality of interfaces to support a second type of optical fiber.

17. The apparatus of claim 11, wherein the optical system comprises a lens assembly through which the image of the identification code is to be captured, the apparatus further comprising:

an actuator to move the lens assembly;

a detection system to detect whether the adapter plate is mounted to the mounting tray; and wherein the controller is to:

initiate an identification code reading operation in response to a detection by the detection system that the adapter plate is mounted to the mounting tray; and lock the actuator from moving in response to a detection by the detection system that the adapter plate is not mounted to the mounting tray.

18. A method of inspecting a terminating end of an optical fiber, the method comprising:

receiving, by a controller, an image of an identification code from an imager of an optical system, wherein the identification code is positioned on a surface of an adapter plate including an interface to support the terminating end of the optical fiber, and wherein the adapter plate is removably supported on a mounting tray;

reading, by the controller, information included in the identification code, wherein the information identifies or is to be used to identify inspection parameters to be used in inspecting the terminating end of the optical fiber;

setting, by the controller, inspection parameters to the identified inspection parameters; and inspecting, by the controller, the terminating end of the optical fiber with the set inspection parameters.

19. The method of claim 18, wherein the optical system comprises a lens assembly, the method further comprising:

controlling an actuator to move the lens assembly to position the identification code within a field of view of the lens assembly to capture the image of the identification code.

20. The method of claim 18, further comprising:

determining, from a detection system, whether the adapter plate is mounted to the mounting tray; and initiate an identification code reading operation in response to determining that the adapter plate is mounted to the mounting tray.

* * * * *